Nov. 23, 1926.
J. M. ODEN
1,607,909
GASOLINE HOSE
Filed June 5, 1924
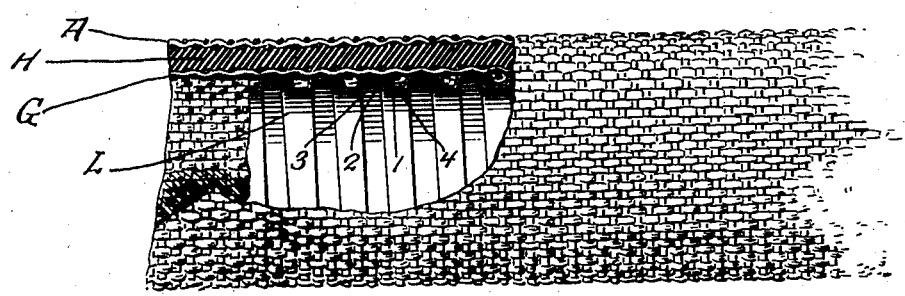
INVENTOR
John M. Oden
BY
L. Sanford Hand
his ATTORNEY Patented Nov. 23, 1926.

1,607,909

UNITED STATES PATENT OFFICE.

JOHN M. ODEN, OF BROOKLYN, NEW YORK.

GASOLINE HOSE.

Application filed June 5, 1924. Serial No. 717,970.

This invention relates to a hose structure.

While the hose constructed in accordance herewith is intended primarily for the carriage of gasoline and similar fluids, it nevertheless may obviously be used for any other analogous purpose.

It is a well-known fact that a hose used in the carriage of gasoline is subject to active deteriorating influences due to the great penetrating chemical effects and properties of the gasoline. On this account the present hose, which is constructed to withstand these deteriorating influences, is properly and familiarly termed a "gasoline" hose.

An object of the present invention is to provide a hose of the type indicated but having greater flexibility than has heretofore been found in such hose.

A further and more detailed object is to provide means whereby the rubber covering which surrounds the flexible metallic liner employed may be given the requisite amount of density, and be maintained in that condition, and yet offer a minimum amount of resistance of the free flexing of the hose.

A further detailed object is to provide a hose having a transversely corrugated flexible metallic liner and to provide a rubber covering for said liner separated therefrom by a flexible sheath which bridges the ridges of the liner and thus permits easier flexing of the liner.

A further detailed object is to provide, in combination with the liner and sheath just mentioned, a second sheath applied exteriorly of the rubber covering and serving to press said rubber and inner sheath against the liner and thus maintain the density of the rubber.

A further and more specific object is to provide a hose comprising a transversely corrugated flexible metallic liner, a woven fabric sheath covering said liner and bridging the ridges thereof, a rubber covering applied over said sheath, and a second woven fabric sheath formed over said rubber covering and serving to condense said rubber covering and hold the same and said inner sheath in close contact with the ridges of the liner.

Other objects and aims of the invention, more or less specific than those referred to above, will be in part obvious and in part pointed out in the course of the following description of the elements, combinations, arrangements of parts, and applications of principles, constituting the invention, and the scope of protection contemplated will be indicated in the appended claim.

The accompanying drawing illustrates a side elevational view of a piece of hose constructed in accordance with this invention, a portion being broken away and shown in transverse section for illustrating the details of construction.

Referring to the drawing for a more detailed description of the structure illustrated thereon, the reference character L indicates the inner metallic liner. The reference character G indicates the woven fabric sheath which covers this liner. The reference character H indicates the rubber covering applied over the sheath G. And the reference character A indicates the outer woven fabric sheath or covering which is applied over the rubber H.

The liner L may be of any approved construction. That illustrated however is of a well-known standard form and is made of a single strip of thin sheet metal bent into S cross-section and spiral form and having its convolutions over-lapping and interlocked in such manner that the exterior of the liner presents a transversely spirally corrugated surface the ridges of which move freely toward and away from each other whenever the liner is flexed, as will be readily understood by anyone familiar with flexible tubes of this character.

Whenever this liner is flexed there is always a movement, or tendency to movement, of the ridges on the exterior surface of the liner toward each other at one side of the liner and away from each other at the opposite side of the liner, and this movement, or tendency to movement, is reversed when the liner is flexed in the opposite direction, and it will be apparent therefore that any impediment placed between said ridges will not only interfere with the flexing of the liner but may, and will, produce severe strains upon the delicate interlocking portions of the liner and cause irreparable injury thereto. It is noted for instance that any impediment placed between the ridges and interfering with or preventing movement of the ridges toward each other on one side of the liner, will, when the liner is flexed, tend to strip apart the delicate interlocking portions at the opposite side of the liner. The force operating against the strained parts would be exerted in a direction almost in a straight line longitudinally of the liner, and it is important to note that in this direction the inherent resistance against stripping of the overlapping parts is considerably less than when the strain is applied in a direction at an appreciable angle from said straight line as would be the case if the impediment to free movement on the first side of the liner be removed. This difference is due to the fact that the straight line strains are resisted only by the interengagement of the transversely bent portions as 1 and 2, of the interlocking parts, whereas the angle strains are resisted not only by the portions 1 and 2, but also by engagement of said portions more or less directly against the adjacent tubular portions 3 and 4.

This explanation is given in order that a principal feature involved in the present invention, may be more readily understood, namely that by keeping the spaces or grooves of the liner unobstructed, a greater amount of flexibility is provided and a greater efficiency and durability secured than has been possible in gasoline hose as hereinbefore constructed in which said grooves are obstructed by parts of the rubber covering.

The sheath G which surrounds the liner is illustrated as made up as a coarse woven fabric, being preferably woven directly about the liner and being of a sufficiently tight texture so that no appreciable amount of the rubber covering H can squeeze through it into contact with the liner. While it is amply flexible and elastic to readily accommodate the bending or flexing movements of the hose it is yet sufficiently stiff to prevent any appreciable sinking or sagging of its component parts into the grooves of the liner. It merely bridges from ridge to ridge along the liner and acts as a shield for said grooves and a support for the rubber cover. By reason of its soft, tough, fibrous and non-adhesive surface texture it also constitutes an admirably efficient wearing element between the liner and the rubber for accommodating the rubbing movements of the ridges of the liner relative to the rubber.

Obviously any other desired form of sheath may be employed to protect the grooves of the liner, but it has been found that the woven fabric or canvas, sheath as illustrated combines the desirable qualities of toughness, strength, resilience, elasticity, flexibility, and non-adhesiveness, coupled with a suitable amount of stiffness, to properly fulfill this office.

The rubber covering H may be made of any desired consistency and thickness. It will be understood however that, since neither the liner L nor the inner sheath G is capable of preventing the passage of gasoline into contact with the rubber, the rubber should be of a proper compound suitable to best withstand the attack of the gasoline, and that it should preferably be as highly compressed, or condensed, as is practical under the conditions of its manufacture and assembly in the hose in order that there may be a minimum of migration of the gasoline into the body of the rubber.

The outer cover or sheath L may be of any preferred type but preferably consists of woven fabric or canvas fabric similar to that comprising the inner sheath. This outer sheath is preferably woven directly about the rubber cover H, and in the operation of applying it a sufficient tension is given to its component strands so that it operates to compress the rubber against the outer surface of the sheath G and to cause such condensation of the rubber as will enable the rubber to efficiently withstand the attacks of the gasoline as above mentioned. By making the outer sheath of woven fabric the same provides a suitable strong and tough protecting armour for the hose and yet one which is suitably elastic and flexible to accommodate the flexing movement of the hose.

Here it will be noted that in gasoline hose as heretofore manufactured it has been common practice to provide a corrugated liner, a rubber cover H, and the outer sheath A substantially of the type and qualities as herein described but without the interposed sheath G, such a hose for instance being illustrated and described in my Patent 1,288,148, December 17, 1918. In these previously manufactured hose however portions of the rubber H have extended into grooves of the liner, and wherever this hose has been made to include a suitable condensing pressure against the rubber, the portions thereof within the grooves of the liner have been so condensed as to be almost non-resilient, and said portions have therefore offered a great impediment to the flexing of the hose and have consequently caused a premature breakdown in many cases for the reasons as have been discussed in detail hereinabove.

Wherever the condensing pressure of the outer sheath has been made less in order to avoid the filling in of the grooves of the liner, the rubber has retained such a degree of its normal porosity that it has rapidly deteriorated under the attack of the gasoline.

And it is furthermore to be noted that in all cases where the rubber occurs between the ridges of the liner, and is therefore subject to constant compression and release due to the incessant movement of the ridges, said portions of the rubber soon succumb to the attack of the gasoline and thereafter impart a detrimental effect to the remaining body of rubber.

By interposing the shield G in the manner as herein disclosed it is possible to apply the outer sheath with full condensing tightness or power and yet attain a degree of flexibility in the hose equal to, and even greater than, the flexibility which could be obtained by the use of the non-condensed rubber just mentioned, and this result is obtained without the likelihood of dangerously straining the interlocking parts of the liner during any normal flexing of the hose.

It should also be noted that while the liner, shown and specifically described herein, is of a well-known corrugated sheet metal type, nevertheless the invention is not to be understood as being restricted to the use of this particular type of liner.

As many changes could be made in this construction without departing from the scope of the invention as defined in the following claim, it is intended that all matter contained in the above description or shown in the accompanying drawings, shall be interpreted as illustrative and not in a limiting sense.

Having thus described my invention, what I claim as new and desire to secure by Letters Patent is:—

In a gasoline hose, comprising a corrugated flexible metallic liner, said liner being formed of a spirally wound strip of metal of substantially S cross-section providing a spirally extending ridge exteriorly of the liner and providing also edge flanges having sliding interengagement preventing separation of adjacent convolutions while yet permitting flexing of the liner, the ridges of the several convolutions being subject to movement toward each other when the liner is flexed out of a straight line thereby reducing the space between said ridges, and a rubber covering for said liner, the combination therewith of a sheathing of cloth fabric woven tightly about said rubber covering exerting a condensing pressure against the rubber and thereby condensing the rubber as and for the purpose set forth, and a second sheathing of cloth fabric woven about the liner intermediate the liner and the rubber covering of a character to bridge the spaces between the ridges of the liner and to thereby support the condensing pressure of the rubber cover while holding the rubber out of the spaces between the ridges and thus maintaining said spaces unobstructed to the movement of said ridges.

In testimony whereof I affix my signature.

JOHN M. ODEN.